United States Patent
Przybyl et al.

(10) Patent No.: US 9,896,178 B1
(45) Date of Patent: Feb. 20, 2018

(54) METHODS AND SYSTEMS OF CONTROLLING ENGINE RPM

(71) Applicant: Brunswick Corporation, Lake Forest, IL (US)

(72) Inventors: Andrew J. Przybyl, Berlin, WI (US); Justin R. Poirier, Fond Du Lac, WI (US); Robert Raymond Osthelder, Omro, WI (US)

(73) Assignee: Brunswick Corporation, Mettawa, OH (US)

( * ) Notice: Subject to any disclaimer, the term of this patent is extended or adjusted under 35 U.S.C. 154(b) by 77 days.

(21) Appl. No.: 15/233,324

(22) Filed: Aug. 10, 2016

(51) Int. Cl.
*B63H 21/21* (2006.01)
*F16H 63/50* (2006.01)

(52) U.S. Cl.
CPC .......... *B63H 21/213* (2013.01); *F16H 63/50* (2013.01); *B63H 2021/216* (2013.01)

(58) Field of Classification Search
CPC .. B63H 21/213; B63H 2021/216; F16H 63/50
See application file for complete search history.

(56) References Cited

U.S. PATENT DOCUMENTS

| | | | |
|---|---|---|---|
| 3,667,431 A * | 6/1972 | Kueny | F01P 7/16 123/41.08 |
| 4,262,622 A * | 4/1981 | Dretzka | B63H 21/213 440/1 |
| 6,109,235 A | 8/2000 | Hoshiba et al. | |
| 6,109,986 A | 8/2000 | Gaynor et al. | |
| 6,273,771 B1 | 8/2001 | Buckley et al. | |
| 6,364,726 B1 | 4/2002 | Motose et al. | |
| 6,929,518 B1 | 8/2005 | Sawyer et al. | |
| 6,942,530 B1 | 9/2005 | Hall et al. | |
| 8,439,800 B1 | 5/2013 | Bazan et al. | |
| 9,043,058 B1 | 5/2015 | Camp et al. | |
| 2015/0183435 A1* | 7/2015 | Johnson | F02N 19/10 701/112 |
| 2016/0003172 A1 | 1/2016 | Yamaguchi et al. | |

OTHER PUBLICATIONS

U.S. Appl. No. 14/627,323.
European Search Report for EP Application 17020318.6 dated Nov. 24, 2017.

* cited by examiner

*Primary Examiner* — Rodney A Butler
(74) *Attorney, Agent, or Firm* — Andrus Intellectual Property Law LLP

(57) ABSTRACT

A method of controlling engine RPM in a marine propulsion device having an engine that effectuates rotation of a propulsor through a gear system that shifts amongst a forward gear position, a reverse gear position, and a neutral position, includes determining that a coolant temperature is below a temperature threshold or that a battery voltage is below a voltage threshold, and then increasing an engine RPM setpoint by a compensation RPM amount while the engines remains in an idle state in order to increase the coolant temperature or the battery voltage. When a shift instruction is detected to transition the gear system from the reverse gear position to the neutral position or from the forward gear position to the neutral position, the engine RPM setpoint is reduced by a shift RPM reduction amount during transition of the gear system, and the engine is controlled according to the engine RPM setpoint.

20 Claims, 4 Drawing Sheets

METHODS AND SYSTEMS OF CONTROLLING ENGINE RPM

FIELD

The present disclosure relates to marine propulsion systems, and more particularly to systems and methods of controlling engine RPM to facilitate shift changes in a marine propulsion device.

BACKGROUND

The following U.S. patents and patent applications provide background information and are incorporated herein by reference in their entireties.

U.S. patent application Ser. No. 14/627,323 discloses an outboard marine engine comprising an internal combustion engine and a propulsor that is driven into rotation by the internal combustion engine so as to effectuate a thrust. The outboard marine engine further includes a transmission that shifts amongst a forward gear wherein the thrust is forward thrust, a reverse gear wherein the thrust is a reverse thrust, and a neutral gear wherein the thrust is a zero thrust. The outboard marine engine further includes a shift rod that is rotatable about its own axis, wherein rotation of the shift rod about its own axis shifts the transmission amongst the forward gear, the reverse gear, and the neutral gear. An actuator operably connects to the internal combustion engine and causes rotation of a gear shaft. At least one gearset connects the gear shaft to the shift rod such that rotation of the gear shaft about its own axis rotates the shift rod about its own axis.

U.S. Pat. No. 9,043,058 discloses methods and systems for facilitating shift changes in a marine propulsion device having an internal combustion engine and a shift linkage that operatively connects a shift control lever to a transmission for effecting shift changes amongst a reverse gear, a neutral gear and a forward gear. A position sensor senses position of the shift linkage. A speed sensor senses speed of the engine. A control circuit compares the speed of the engine to a stored engine speed and modifies, based upon the position of the shift linkage when the speed of the engine reaches the stored engine speed, a neutral state threshold that determines when the control circuit ceases reducing the speed of the engine to facilitate a shift change.

U.S. Pat. No. 8,439,800 discloses a shift control system for a marine drive that applies partial clutch engagement pressure upon initial shifting from forward to reverse to prevent stalling of the engine otherwise caused by applying full clutch engagement pressure upon shifting from forward to reverse.

U.S. Pat. No. 6,942,530 discloses an engine control strategy for a marine propulsion system selects a desired idle speed for use during a shift event based on boat speed and engine temperature. In order to change the engine operating speed to the desired idle speed during the shift event, ignition timing is altered and the status of an idle air control valve is changed. These changes to the ignition timing and the idle air control valve are made in order to achieve the desired engine idle speed during the shift event. The idle speed during the shift event is selected so that the impact shock and resulting noise of the shift event can be decreased without causing the engine to stall.

U.S. Pat. No. 6,929,518 discloses a shifting apparatus for a marine propulsion device that incorporates a magnetoelastic elastic sensor which responds to torque exerted on the shift shaft of the gear shift mechanism. The torque on the shift shaft induces stress which changes the magnetic characteristics of the shift shaft material and, in turn, allows the magnetoelastic sensor to provide appropriate output signals representative of the torque exerted on the shift shaft. This allows a microprocessor to respond to the onset of a shifting procedure rather than having to wait for actual physical movement of the components of the shifting device.

U.S. Pat. No. 6,273,771 discloses a control system for a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 6,109,986 discloses an idle speed control system for a marine propulsion system that controls the amount of fuel injected into the combustion chamber of an engine cylinder as a function of the error between a selected target speed and an actual speed. The speed can be engine speed measured in revolutions per minute or, alternatively, it can be boat speed measured in nautical miles per hour or kilometers per hour. By comparing target speed to actual speed, the control system selects an appropriate pulse width for the injection of fuel into the combustion chamber and regulates the speed by increasing or decreasing the pulse width.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a method of controlling engine RPM in a marine propulsion device is provided, the marine propulsion device including an engine that effectuates rotation of a propulsor through a gear system that shifts amongst a forward gear position, a reverse gear position, and a neutral position. The method includes determining that a coolant temperature is below a temperature threshold or that a battery voltage is below a voltage threshold, and then increasing an engine RPM setpoint by a compensation RPM amount while the engines remains in an idle state to increase the coolant temperature or the battery voltage. The method further includes detecting a shift instruction to transition the gear system from the reverse gear position to the neutral position or from the forward gear position to the neutral position. The engine RPM setpoint is then reduced by a shift RPM reduction amount during transition of the gear system, and the engine is controlled according to the engine RPM setpoint.

One embodiment of a marine propulsion system includes an engine that effectuates rotation of a propulsor in order to generate a thrust on a marine vessel and a gear system between the engine and the propulsor that shifts amongst a forward gear position that generates a forward thrust, a reverse gear that generates a reverse thrust, and a neutral position. A control module controls the engine based on an engine RPM setpoint, wherein the control module determines that the coolant temperature is below a temperature threshold or that a battery voltage is below a voltage threshold, and then increases the coolant temperature or the battery voltage by increasing an engine RPM setpoint by a compensation RPM amount while the engine remains in an idle state. The control module further detects a shift instruction to transition the gear system from the reverse gear position to the neutral position or from the forward gear position to the neutral position, and then reduces the engine RPM setpoint for the engine during transition of the gear system.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Figure 1:
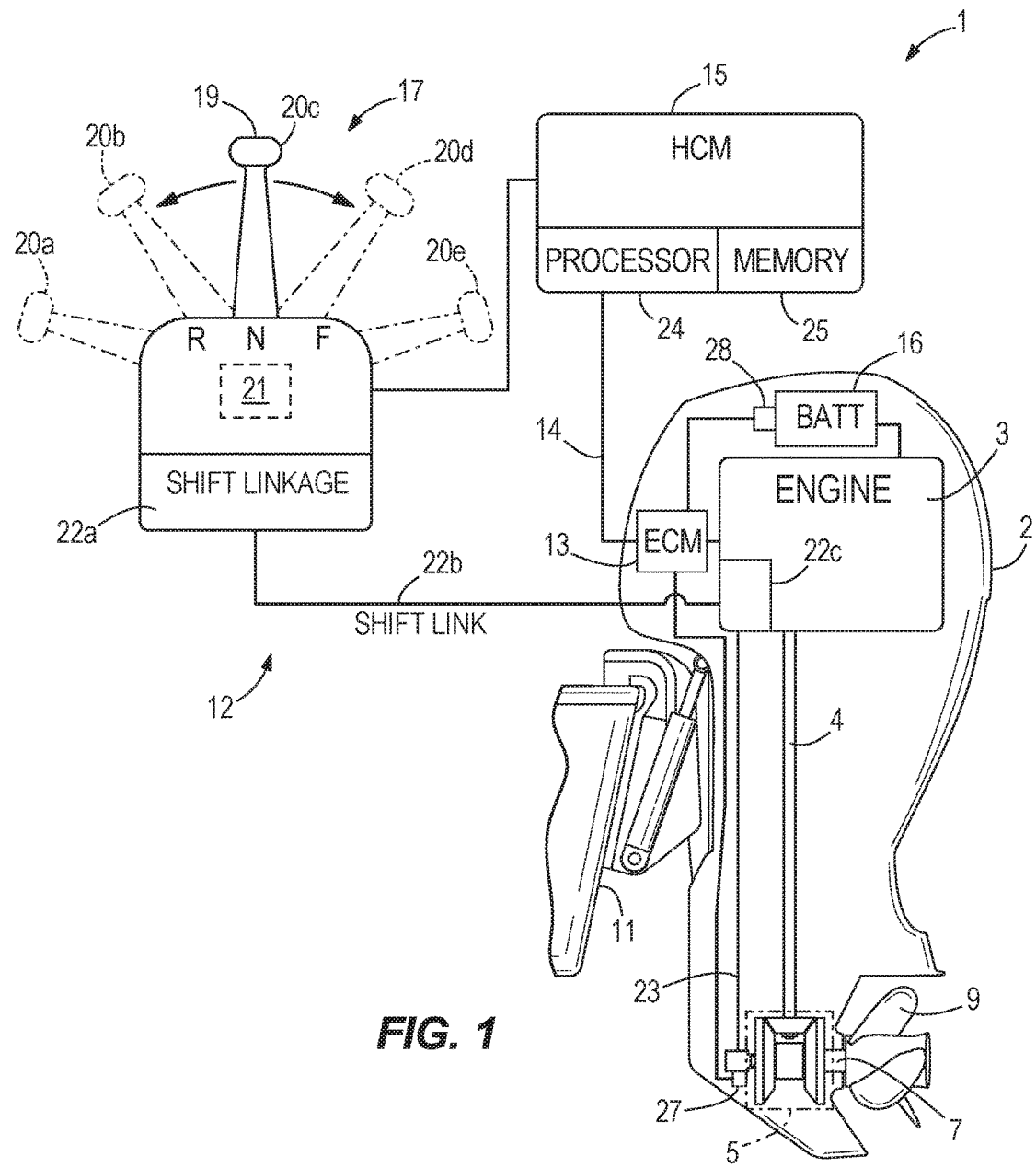
FIG. 1 depicts one embodiment of a marine propulsion system.

FIG. 1 depicts an exemplary marine propulsion system 1 on a marine vessel 11. In the examples shown and described herein, the marine propulsion system 1 includes an a marine propulsion device 2 being an outboard motor; however, the concepts of the present disclosure are not limited for use with outboard motors and can be implemented with other types of marine propulsion devices, such as inboard motors, stern drives, hybrid-electric marine propulsion systems, pod drives, and/or the like. In the examples shown and described, the outboard motor 2 has an internal combustion engine 3 causing rotation of a drive shaft 4, which in turn causes rotation of a propulsor shaft 7. A propulsor 9 is connected to and rotates with the propulsor shaft 7 to propel the marine vessel 11 through water. In the depicted embodiment, the propulsor 9 is a propeller; however, in alternate embodiments the propulsor 9 may include one or more propellers, impellers, or any other device for creating a thrust force in water to propel the marine vessel 11.

The direction of rotation of the propulsor shaft 7 and propulsor 9 is changeable by a gear system 5 connecting the drive shaft 4 to the propulsor shaft 7. The gear system 5 may be any type of clutch or transmission. In the example of FIG. 1, the gear system 5 is a conventional dog clutch; however, the gear system 5 may include any other type of clutch or transmission capable of shifting between a forward gear, which translates the rotation of the drive shaft 4 into a rotational direction of the propulsor shaft 7 to create a forward thrust on the marine vessel 11, a reverse gear converting rotation of the drive shaft 4 into rotation of the propulsor shaft 7 to create a reverse thrust on the marine vessel 11, and a neutral position where no thrust is created.

The marine propulsion system 1 also includes shift system 12 that allows user input control of the gear system 5. In the depicted embodiment, the shift system 12 includes a remote control 17, shift linkages 22a-22c, a shift rod 23, and gear system 5. The remote control 17 has a control lever 19 operable by a user to instruct the gear system 5 to shift between the forward gear position, the reverse gear position, and the neutral position. In the depicted example, the control lever 19 is a combination shift/throttle lever that is pivotably movable between various positions that include reverse wide open throttle position 20a, reverse detent position (zero throttle, idle) 20b, neutral position 20c, forward detent position (zero throttle, idle) 20d, and a forward wide open throttle position 20e. The remote control 17 is typically located remote from the marine propulsion device 2. The control lever 19 may be operably connected to the gear system 5 via a physical linkage connection or by electronic drive-by-wire means in order to translate the user instruction from the control lever 19 to the gear system 5 and the control modules controlling the engine 3. The depicted embodiment of the shift system 12 presents one conventional arrangement where the control lever 19 is operably connected to the gear system 5 via a shift linkages 22a-22c, such that pivoting movement of the control lever 19 can cause corresponding movement of the shift linkages 22a-22c. Portions 22a of the shift linkages 22a-22c are typically located at the remote control 17 and other portions 22c of the shift linkages 22a-22c are located at the engine 3. The shift linkages 22a-22c also includes a shift link 22b that translates movement of the control lever 19 to the portion 22c of the shift linkages 22a-22c in the marine propulsion device 2, and ultimately to the shift rod 23, for causing the gear system 5 to transition between the forward, neutral, and reverse gears. The shift link 22b can be for example a cable and/or the like.

In the depicted embodiment, the remote control 17 includes position sensor 21 to sense the position of the control lever 19. In the embodiment, information from the position sensor 21 is sent to the helm control module (HCM) 15, which is in turn used to control the engine 3 and the gear system 5 in order to effectuate propulsion according to the user instruction. Alternatively, the information from the position sensor may be received directly by the ECM 13, (especially in embodiments having a mechanical shift linkage 22a-22) which may then effectuate control of the engine 3 and gear system 5 accordingly. For example, the position sensor 21 may detect events related to a shift instruction from the user, such as a user beginning to move from the forward detent position 20d into the neutral position 20c, or from the reverse detent position 20b to the neutral position 20c. Multiple of such shift sensing arrangements are conventional and known in the relevant art, including exemplary shift sensing methods and systems described in U.S. Pat. No. 6,929,518 incorporated herein above. For example, a shift instruction may be detected by a position or other sensor in any number of locations in the shift system 12, such as on a portion of the shift linkage 22a-22c. In other embodiments of the shift system 12, the remote control 17 may be connected to the shift shaft 23 or the gear system via an electronic control arrangement that electrically, such as by wired or wireless digital transmission means, transmits digital shift commands from the remote control 17 to a control unit (such as the HCM 15 or ECM 13) that controls an actuator that shifts the gear system 5, thus eliminating the shift linkage 22a-22c.

The marine propulsion system 1 includes one or more control modules 13, 15 to control function of the engine 3 and/or gear system 5 and to facilitate user control inputs. The HCM 15 and ECM 13 exchange and communicate control signals via communication link 14, which may be by any wired or wireless means. For example, communication link 14 may be a CAN bus. In the depicted embodiment, the HCM 15 receives information from the remote control 17, and specifically from position sensor 21, and transmits corresponding instructions to the engine control module (ECM) 13, which controls the engine 3 and the gear system 5 accordingly. For example, the ECM 13 controls a rotational speed of the engine 3 (engine RPM) according to an engine RPM setpoint, which is determined in part based on the position of the handle 19 of the remote control 17. In certain embodiments where the shifting is electronically controlled, e.g., drive-by-wire systems referenced above, the ECM 13 and/or the HCM 15 can command the position of the gear system 5, such as by controlling an actuator connected to shift rod 23, such as those exemplified and described in U.S. Pat. No. 9,043,058 and U.S. application Ser. No. 14/627,323.

The engine 3 and gear system 5, along with various other portions of the propulsion device 2, are cooled by a coolant system that circulates coolant fluid therethrough. A temperature sensor 27 may be positioned within the coolant system to measure a coolant temperature, e.g. temperature of the coolant fluid. The coolant temperature may be generally taken as a proxy for engine temperature and a temperature of the elements within the propulsion device as a whole, including of the gear system 5. As is known to a person having ordinary skill in the art, upon engine startup the coolant in the coolant system is below optimal temperature range, and it is desirable to warm up the coolant and the gear system, to bring them within the optimal temperature range as quickly as possible. One way of doing so is by increasing engine RPM while the engine remains in the idle state, which increases heat generation by the elements within the propulsion device 2 and increases coolant flow.

As is conventional, the marine propulsion device 2 includes a battery 16 used to power various elements within the propulsion device 2, the battery being recharged by rotation of the engine 3 via an alternator or a stator. A voltage measurement circuit 28 may be associated with the battery 16 in order to measure a battery voltage level. While the voltage measurement circuit 28 is depicted in the figure as a separate device in vicinity of the battery 16, in other embodiments the voltage measurement circuit 28 may be located elsewhere on the marine vessel 11. For instance, in certain applications the measurement circuit 28 may be contained within the ECM 13 and/or the HCM 15. For example, the voltage measurement circuit 28 measures a voltage level of the battery 16 and provides the voltage measurement value to the ECM 13, and in some embodiments the voltage measurement value may also be provided to the HCM 15.

As depicted in FIG. 1, the HCM 15 includes a processor 24 and memory 25. For example, the processor 24 may be a microprocessor or microcontroller, a general purpose central processing unit, any type of logic device, or any other type of processing device or combination of processing devices. The memory 25 can comprise any storage media readable by a processor 24 and associated circuitry. The memory 25 may include volatile and/or non-volatile, removable and/or non-removable media implemented in any method or technology for storage of information, such as computer-readable instructions, data structures, program modules, or other data. Examples of storage media include random axis memory, read only memory, magnetic storage devices, optical discs, flash memory, virtual memory, non-virtual memory, or any other medium which can be used to store the desired information. The ECM 13 is also a programmable device including a processor and memory not depicted in the figure. The HCM 15 and ECM 13 further include circuitry that facilitates retrieval and execution of software stored on memory 25. In the depicted embodiment, control of the marine propulsion system 1 is distributed between the HCM 15 and the ECM 13; however, in other embodiments the control function may be provided by a single control module. In still other embodiments, the system control, including execution of the control methods described herein, may be distributed across any number of control modules each including any number of processors. The HCM 15 and ECM 13 may be positioned at any location with respect to the marine vessel 11 and the propulsion device 2. For example, the HCM 15 may be in proximity to a helm of the marine vessel 11 and the ECM 13 may be in proximity to the propulsion device 2, such as within the housing of the propulsion device 2.

The inventors have recognized that engine RPM can be increased as a compensation strategy, such as to decrease engine warm up time (i.e. to increase the temperature of the engine and coolant fluid in the engine at a faster rate) and/or to increase charge rate of a battery having a low voltage level. For example, upon determination that a coolant temperature is below a temperature threshold or that a battery voltage is below a voltage threshold, the ECM 13 or HCM 15 may increase the engine RPM setpoint for the engine 3 by a compensation RPM amount. Such RPM compensation strategies can be used within an idle control algorithm, i.e., when the engine is in an idle state, to warm an engine more quickly or to increase charging to the battery. For example, idle RPM may be increased by anywhere from 25 to 300 RPM in order to warm up the engine and/or increase charging to the battery. However, the inventors have also recognized that when the idle engine speed is increased while the gear system 5 is in gear (i.e. in the forward gear position or the reverse gear position) the increase of RPM at idle increases the forces on the gear system 5 and can make it difficult to shift the gear system 5 out of gear and into the neutral position. Accordingly, the inventors have recognized that implementation of RPM compensation strategies to warm up the engine or increase battery charging requires that some or all of the RPM increase be pulled out prior to transitioning the gear system 5 out of forward gear or reverse gear in order to allow for smooth and easy shifting of the gear system 5 between either gear position and the neutral state. Reducing the engine RPM during the shift event decreases the torque and load placed on the gear system 5 when disengaging from the reverse gear position and the forward gear position, and also reduces the noise and shock experienced by the user associated with the shift event.

In various embodiments, the amount that the engine RPM setpoint is reduced—the shift RPM reduction amount—during a shift event can be determined in a number of ways. For example, the shift RPM reduction amount may be equal to the compensation RPM—e.g., the amount that the engine RPM setpoint was increased to compensate for the low coolant temperature and/or the low battery voltage. In another embodiment, the engine RPM setpoint may be reduced to a predetermined baseline idle RPM value during a shift event, and thus the shift RPM reduction amount will be equal to the difference between the engine RPM setpoint before the detection of a shift instruction and the predetermined baseline idle RPM value. In still other embodiments, the shift RPM reduction amount may be a value determined based on one or more inputs, such as a sensed coolant temperature or battery voltage value. In one embodiment, the shift RPM reduction amount may be determined based on a lookup table of RPM reduction values indexed based on relevant values, such as coolant temperature, low voltage compensation RPM, low temperature compensation RPM, total compensation RPM amount, and/or any number of other inputs, examples of which are described below. As another example, the shift RPM reduction amount may be a calculated based on the compensation RPM amount, such as based on one or more of the low voltage compensation RPM or the low temp compensation RPM. For instance, the reduction amount could be calculated as a percentage of the low voltage compensation RPM and/or the low temp compensation. In general, shift RPM reduction will be proportional to the compensation RPM amount, which will increase as the coolant temperature goes down.

Figure 2:
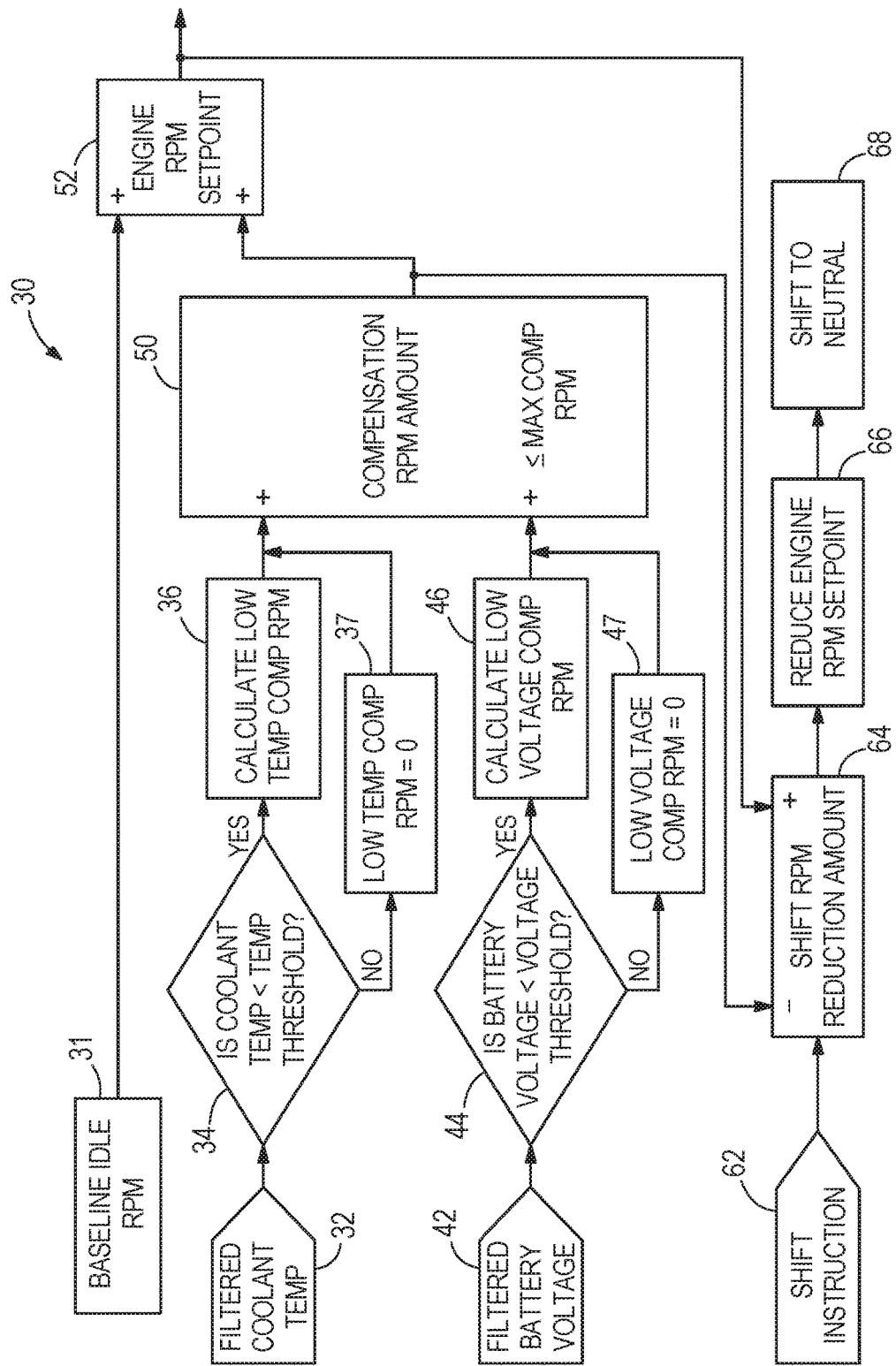
FIG. 2 depicts one embodiment of a method of controlling engine RPM.

Various embodiments of the method 30 of controlling engine RPM may be executed by a control module within the marine propulsion system 1, and in the embodiment depicted in FIG. 1 may be executed by the HCM 15 or the ECM 13, or portions of the method may be distributed across and executed by each of the HCM 15 and ECM 13. For example, the method 30 may be carried out by executing computer-readable instructions stored in memory 25 on the processor 14 of the HCM 15, and/or doing the same on the ECM received at step 31 (FIG. 2), while the engine is in an idle state, such as when the idle governor is active to set an idle RPM setpoint. Alternatively, for purposes of executing this method, the baseline idle RPM may be a preset constant value, such as a predetermined optimum baseline idle RPM determined for a particular propulsion device 2 under average operating conditions. In the example of FIG. 2, the coolant temperature is received at step 32 such as from the temperature sensor 27 in the coolant system. Step 34 determines whether the coolant temperature is less than a temperature threshold. For example, the temperature threshold may be a preset value below which it is determined that any compensation RPM amount needs to be added in order to increase the coolant temperature. If the coolant temperature is not below the temperature threshold, then the low temperature RPM compensation value is set to zero at step 37 because no RPM compensation is needed to increase the coolant temperature. If the coolant temperature is below the temperature threshold at step 34, then a low temperature compensation RPM is calculated at step 36. For example, the low temperature compensation RPM may be provided in a lookup table based on the coolant temperature, such as a one-dimensional lookup table of low temperature compensation RPM values (e.g., an RPM amount that should be added to the baseline idle RPM) based on coolant temperatures. In such an embodiment, the low temperature compensation RPM would increase as the coolant temperature decreases away from the threshold temperature. The low temperature compensation RPM is then fed to summation block 50.

A battery voltage value is received at step 42, such as from the voltage measurement circuit 28. Step 44 determines whether the battery voltage is less than a voltage threshold. The voltage threshold may be a preset voltage value below which the battery needs increased charging, which is provided by increasing the RPM setpoint as described above. If the battery voltage level is not below the voltage threshold then compensation RPM is not necessary and is set to zero at step 47. If the battery voltage measurement is below the voltage threshold at step 44, then a low voltage compensation RPM is calculated at step 46. For example, the low voltage compensation RPM may be a calculated value based on any number of factors, such as how far below the battery voltage threshold the measured battery voltage is, the current baseline idle RPM value, the low temperature compensation RPM value, or any other number of factors which might play into the determination of an RPM setpoint. The low voltage compensation RPM is then fed to the summation block 50, where the compensation RPM amount is determined based on the low temperature compensation RPM and the low voltage compensation RPM. In one embodiment, the summation block may be provided with a saturation point, which is a maximum RPM value permitted for the low battery and low temperature compensation.

In various embodiments, the coolant temperature value received at step 32 and/or the battery voltage value received at step 42 may be filtered values. For example, a moving average filter or other type of smoothing filter may be applied to the coolant temperature measurements from the temperature sensor 27 and/or to the battery voltage measurements from the voltage measurement circuit 28 so that the RPM values are not constantly fluctuating based on momentary or errant fluctuations in the battery voltage or coolant temperature measurements.

The compensation RPM amount outputted from the summation block 50 is provided to summation block 52 where the engine RPM setpoint is determined by adding the compensation RPM amount to the baseline idle RPM. The engine RPM setpoint output of block 52 is used to control the engine RPM unless or until a shift instruction is received.

A shift instruction is received at step 62, such as based on input from position sensor 21 indicating that a user is initiating an instruction to shift the gear system 5 from a forward gear position or a reverse gear position into a neutral position. As described above, the position sensor 21 may be at any of various locations within the shift system 12, such as in the remote control 17, in the shift linkage 22a-22c, or on the shift shaft 23. In embodiments with electronic shift control, a controller (such as the HCM 15 or the ECM 13) will instruct a corresponding shift of the gear system 5. In embodiments with a mechanical shift system 12, the mechanical shift linkage 22a-22c will automatically shift the gear system 5. A shift RPM reduction is calculated at step 64 in order to determine a reduced RPM setpoint for effectuating a slowdown of the engine 3 in order to ease the transition out of the gear position. In the depicted embodiment, the shift RPM reduction is calculated by subtracting the compensation RPM from the RPM setpoint, which effectively removes the low temperature compensation RPM and the low voltage compensation RPM and reverts back to the baseline idle RPM. The engine RPM setpoint is reduced at step 66 by the shift RPM reduction amount. The engine 3 is then controlled to the reduced engine RPM setpoint, and the gear system 5 is shifted out of the forward gear position or reverse gear position into neutral at step 68. In embodiments involving electronic shift control, the shift instruction may be coordinated to effectuate the shift step 68 after the engine 3 reaches the reduced engine RPM setpoint. In mechanical shift embodiments, no control is exercised over the timing of the shift event and thus the system 1 must effectuate the RPM reduction quickly ahead of the mechanical transfer of the shift motion to the gear system 5.

Figure 3:
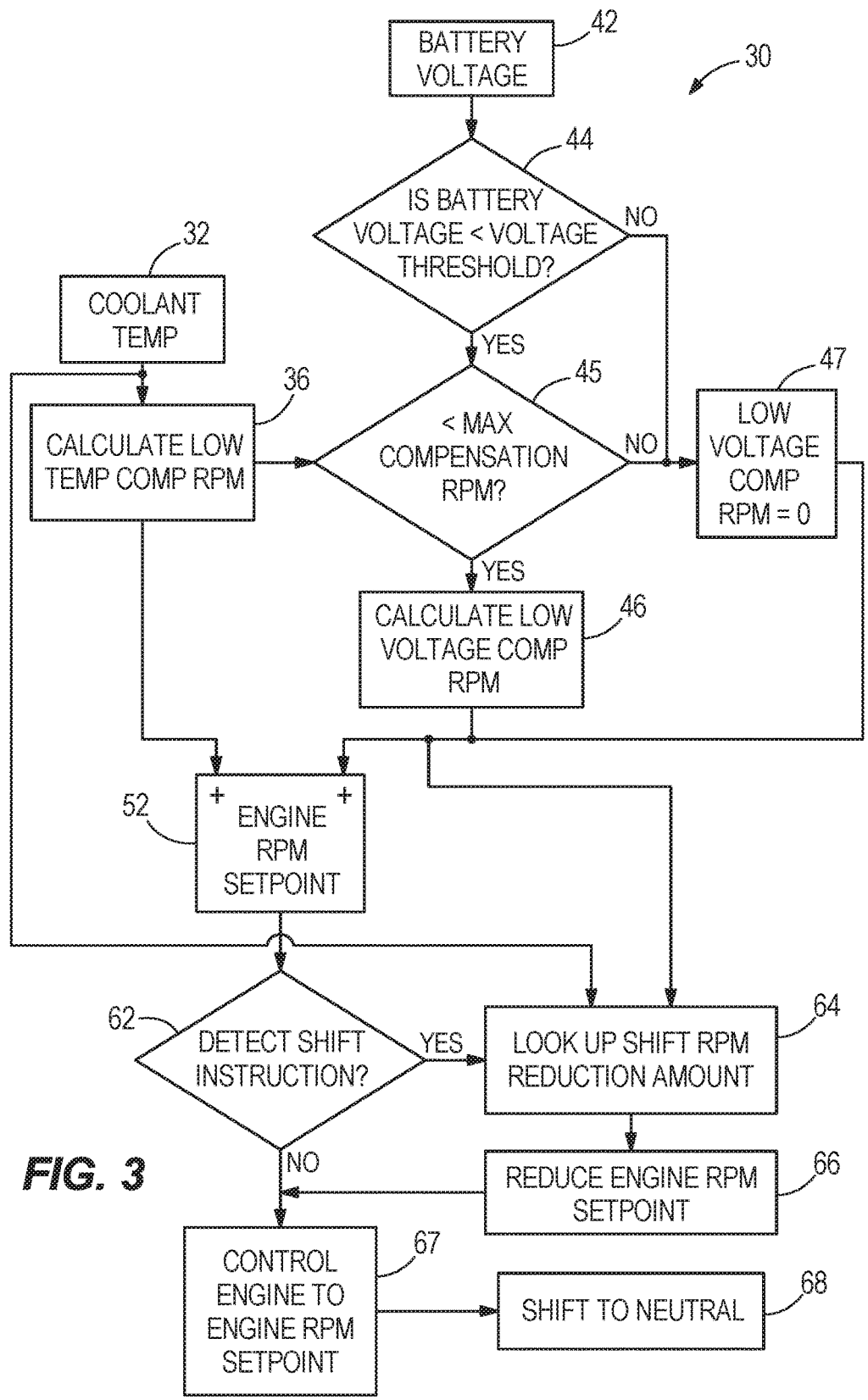
FIG. 3 depicts another embodiment of a method of controlling engine RPM.

FIG. 3 depicts another embodiment of a method 30 of controlling engine RPM. Coolant temperature is received at step 32 and low temperature RPM is calculated at step 36 based on the coolant temperature, as is described above. In the depicted embodiment, the low temperature compensation RPM includes a baseline idle RPM and is calculated therefrom or determined based on the baseline idle RPM. For example, as described above, the low temperature compensation RPM may be provided in a table based on coolant temperature, and in such an embodiment the table would be calibrated to account for a the running idle RPM setting, such as the output of an idle RPM governor. Further, the table may include all temperatures, including those above the temperature threshold for RPM compensation, in which case the values in the table associated with coolant temperatures above the temperature threshold would not include additional compensation RPM and would thus be lower than the RPM values associated with the lower coolant temperatures. For instance, such a table may be a single row table that includes a multiplier of the baseline idle RPM (which would be 1 at or above the threshold value), or it may be a two dimensional table based on baseline idle RPM and coolant temperature. Battery voltage measurements are received at step 42, and the battery voltage value is compared to a voltage threshold at step 44 as described above. If the battery voltage is not below the voltage threshold for applying compensation RPM, then the low voltage compensation RPM is set to zero at step 47 as described above. If the battery voltage is less than the threshold, then the control module continues to step 45, where it determines whether the current RPM setpoint, which includes the low temperature compensation RPM determined at step 36, is less than a maximum value. In other words, step 45 builds in an RPM maximum above which no additional RPMs will be added for battery voltage compensation. If the RPM setpoint is at or above that maximum value, or saturation point, then no additional RPMs can be added based on the battery voltage value and the low voltage compensation RPM is set to zero at step 47. If the RPM setpoint has not reached the maximum, then the low voltage compensation RPM is calculated at step 46. For example, step 46 may add a preset amount of RPM to the low temperature compensation RPM calculated at step 36. Thereby, additional RPM can be slowly feathered in for battery voltage compensation over time through multiple method cycles until the max compensation RPM is reached or the voltage or temperature thresholds are reached. In another embodiment, the RPM maximum value can be adjusted to allow for such "feathering in" of the compensation amount, and can slowly increase over multiple method cycles to allow for additional compensation RPM. Such a "feathering in" strategy may be useful for user comfort so that the user does not notice a sudden increase in engine RPM during idle. The engine RPM setpoint is then determined at step 52 based on the low temperature compensation RPM and the low voltage compensation RPM, such as by adding the two values. Unless and until a shift instruction is detected, the method continues to step 67 and engine 3 is controlled based on the engine RPM setpoint determined at step 52.

Figure 4A:
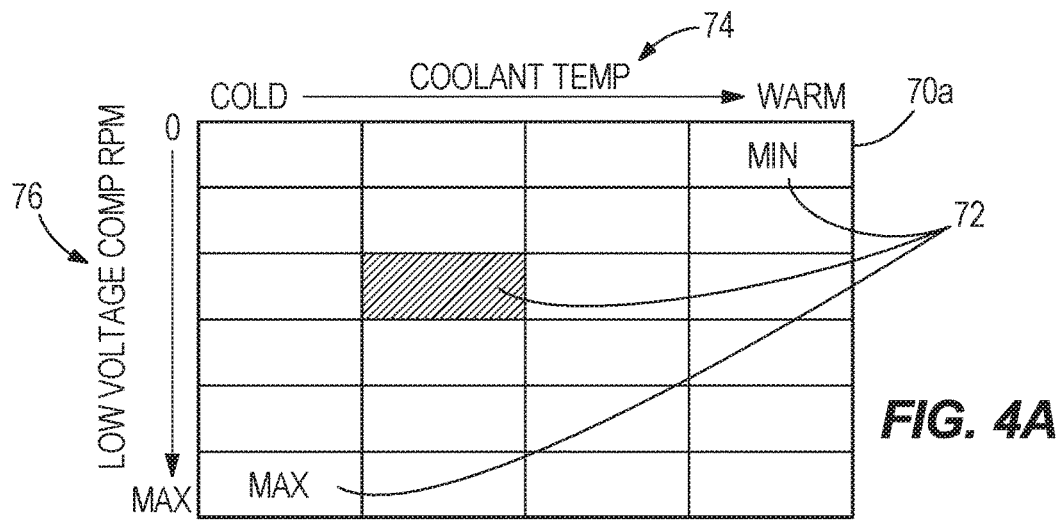
FIGS. 4A-4C depict exemplary lookup tables for use in a system and method for facilitating control of engine RPM.
Figure 4B:
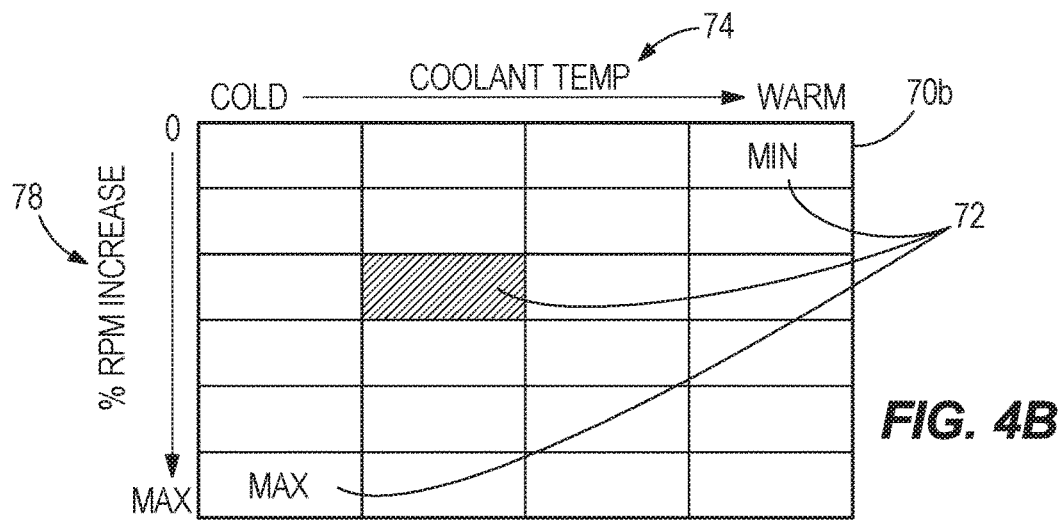
Figure 4C:
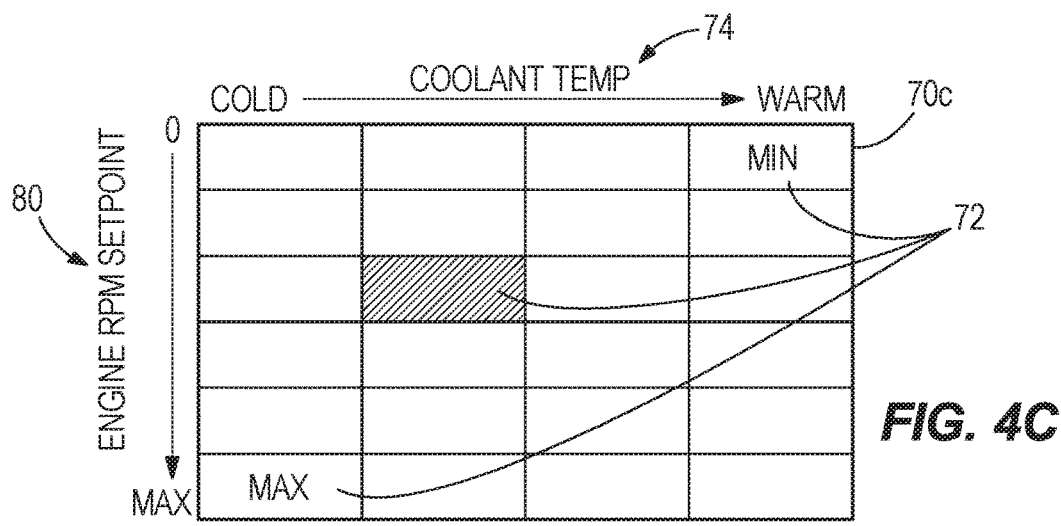

Once a shift instruction is detected at step 62, a shift RPM reduction amount is determined at step 64. In the depicted embodiment, the shift RPM reduction amount is determined by accessing the value on a lookup table. FIGS. 4A through 4C depict exemplary lookup tables 70a, 70b, 70c that could be utilized to determine the shift RPM reduction amount 72. For example, the table in FIG. 4A is an index of shift RPM reduction amounts based on various low voltage compensation RPM values 76 and various coolant temperature values 74. The lookup table 70a is accessed based on the low voltage compensation RPM calculated at step 46 and the coolant temperature value received at step 32 to determine a corresponding shift RPM reduction amount 72. In the depicted example, the low voltage axis of compensation RPM values 76 has increasing values from top to bottom, where the top row is a zero value and the bottom row is the maximum possible low voltage compensation RPM value. The depicted example also has the axis of coolant temperature values 74 increasing from left to right, with the right-most column representing a fully warmed engine, which for example could be the temperature threshold for applying the compensation RPM. Accordingly, the right-most upper cell represents a minimum shift RPM reduction amount 72, which could be zero, and then left-most lower cell represents a maximum shift RPM reduction amount 72. A person having ordinary skill in the art will understand in light of this disclosure that the table could be organized in any number of ways to achieve the same ends. The lookup tables 70a, 70b, 70c are calibratable, such as calibrated based on the shift RPM reduction amount 72 that provides the best "feel" to an end user during a shift event. Accordingly, utilization of a control strategy employing a lookup table allows control and flexibility.

FIGS. 4B and 4C depict additional exemplary lookup tables 70b and 70c. Lookup table 70b of FIG. 4B provides shift RPM reduction amounts 72 based on coolant temperature values 74 and percent RPM increase values 78, such as the percent increase above a baseline idle RPM that has been added for low voltage compensation. For example, with reference to the method of FIG. 2, the percent RPM increase values 78 may represent the percent of the low voltage compensation RPM calculated at step 46 compared to the baseline idle RPM determined at step 31. With reference to FIG. 3, the percent RPM increase may be the percent of the low voltage compensation RPM calculated at step 46 compared to the low temperature compensation RPM determined at step 36, which includes the baseline idle RPM. In other embodiments, a table similar to FIG. 4B could have an axis representing the percentage of the current engine RPM setpoint comprised by the low voltage compensation RPM. Similar to the example lookup table 70a, the exemplary lookup table 70b contains coolant temperature values that increase from right to left and percent RPM values that increase top to bottom. Accordingly, the right-uppermost cell represents the minimum shift RPM reduction amount 72 such as zero, and the left-lowermost cell represents the maximum shift RPM reduction amount 72. FIG. 4C presents another exemplary lookup table 70c with an axis based on engine RPM setpoint values 80. Accordingly, with reference to the embodiments to FIGS. 2 and 3, the table 70c is accessed based on the engine RPM setpoint value determined at step 52 and the coolant temperature received at step 32.

Once the shift RPM reduction amount is determined at step 64, the engine RPM setpoint is reduced accordingly at step 66, and the engine is controlled to the engine RPM setpoint at step 67. The gear system 5 is shifted into the neutral position at step 68 while the engine is running at the reduced RPM.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A method of controlling engine RPM in a marine propulsion device, the marine propulsion device including an engine that effectuates rotation of a propulsor through a gear system that shifts amongst a forward gear position, a reverse gear position, and a neutral position, the method comprising:
determining that a coolant temperature is below a temperature threshold or that a battery voltage is below a voltage threshold;
increasing an engine RPM setpoint by a compensation RPM amount while the engine remains in an idle state in order to increase the coolant temperature or the battery voltage;
detecting a shift instruction to transition the gear system from the reverse gear position to the neutral position or from the forward gear position to the neutral position;
reducing the engine RPM setpoint by a shift RPM reduction amount during transition of the gear system; and
controlling the engine according to the engine RPM setpoint.

2. The method of claim 1, wherein the step of reducing the engine RPM setpoint includes reducing the engine RPM setpoint by the compensation RPM amount.

3. The method of claim 1, wherein the engine RPM is reduced to a baseline idle RPM value.

4. The method of claim 1, wherein the compensation RPM amount is the sum of a low voltage compensation RPM and a low temp compensation RPM up to a maximum compensation RPM.

5. The method of claim 1, wherein the step of reducing the engine RPM setpoint includes accessing a lookup table of shift RPM reduction amounts.

6. The method of claim 5, wherein the lookup table comprises the shift RPM reduction amounts based on coolant temperature values and low voltage compensation RPM values.

7. The method of claim 6, wherein the low voltage compensation RPM values are percentages of a predetermined baseline idle RPM value.

8. The method of claim 5, wherein the lookup table comprises the shift RPM reduction amounts based on coolant temperature values and engine RPM setpoint values.

9. The method of claim 1, wherein the step of detecting the shift instruction includes receiving input from a position sensor associated with a shift system.

10. The method of claim 9, wherein the position sensor senses a control lever position on a remote control and communicates the control lever position to a helm control module.

11. The method of claim 1, wherein the step of increasing the engine RPM setpoint by the compensation RPM amount includes incrementally increasing the engine RPM setpoint over a period of time until a maximum compensation RPM is reached.

12. The method of claim 1, wherein the step of determining that the coolant temperature is below a temperature threshold includes:
receiving a sensed temperature value;
filtering the sensed temperature value to produce a filtered temperature value; and
comparing the filtered temperature value to the temperature threshold.

13. The method of claim 1, wherein the step of determining that the battery voltage is below the voltage threshold includes:
receiving a measured voltage value across the battery;
filtering the measured voltage value to produce a filtered voltage value; and
comparing the filtered voltage value to the voltage threshold.

14. A marine propulsion system comprising:
an engine that effectuates rotation of a propulsor in order to generate a thrust on a marine vessel;
a gear system between the engine and the propulsor that shifts amongst a forward gear position that generates a forward thrust, a reverse gear position that generates a reverse thrust, and a neutral position;
a control module that controls the engine based on an engine RPM setpoint, wherein the control module:
determines that a coolant temperature is below a temperature threshold or that a battery voltage is below a voltage threshold;
increases the coolant temperature or the battery voltage by increasing an engine RPM setpoint by a compensation RPM amount while the engine remains in an idle state;
detects a shift instruction to transition the gear system from the reverse gear position to the neutral position or from the forward gear position to the neutral position; and
reduces the engine RPM setpoint by a shift RPM reduction amount during transition of the gear system.

15. The marine propulsion system of claim 14, wherein control module reduces the engine RPM setpoint by the compensation RPM amount.

16. The marine propulsion system of claim 14, wherein the compensation RPM amount is the sum of a low voltage compensation RPM and a low temp compensation RPM up to a maximum compensation RPM.

17. The marine propulsion system of claim 14, further comprising a lookup table of shift RPM reduction amounts accessed by the control module to determine the compensation RPM amount.

18. The marine propulsion system of claim 17, wherein the lookup table comprises the shift RPM reduction amounts based on coolant temperature values and low voltage compensation RPM values.

19. The marine propulsion system of claim 18, wherein the low voltage compensation RPM values are percentages of a predetermined baseline idle RPM value.

20. The marine propulsion system of claim 17, wherein the lookup table comprises the shift RPM reduction amounts based on coolant temperature values and engine RPM setpoint values.

* * * * *

UNITED STATES PATENT AND TRADEMARK OFFICE
CERTIFICATE OF CORRECTION

PATENT NO. : 9,896,178 B1  
APPLICATION NO. : 15/233324  
DATED : February 20, 2018  
INVENTOR(S) : Andrew J. Przybyl, Justin R. Poirier and Robert Raymond Osthelder Page 1 of 1

It is certified that error appears in the above-identified patent and that said Letters Patent is hereby corrected as shown below:

On the Title Page

[73] Assignee:  
Delete "Mettawa, OH" and insert --Mettawa, IL--

Signed and Sealed this  
Eighteenth Day of June, 2019

Andrei Iancu  
*Director of the United States Patent and Trademark Office*